(12) United States Patent

Matsuo et al.

(10) Patent No.: US 12,573,972 B2

(45) Date of Patent: Mar. 10, 2026

(54) ELECTRIC POWER GENERATION SYSTEM

(71) Applicant: Hitachi Construction Machinery Co., Ltd., Tokyo (JP)

(72) Inventors: Kosuke Matsuo, Tokyo (JP); Satoru Kaneko, Tokyo (JP); Masatoshi Yoshimura, Tokyo (JP); Kazuo Nishihama, Tokyo (JP); Seiji Ishida, Ibaraki (JP); Toshihiko Watanabe, Ibaraki (JP); Tokuma Ikegami, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/689,527

(22) PCT Filed: Oct. 17, 2022

(86) PCT No.: PCT/JP2022/038622

§ 371 (c)(1),
(2) Date: Mar. 6, 2024

(87) PCT Pub. No.: WO2023/074446

PCT Pub. Date: May 4, 2023

(65) Prior Publication Data

US 2024/0396481 A1 Nov. 28, 2024

(30) Foreign Application Priority Data

Oct. 28, 2021 (JP) ................................. 2021-176492

(51) Int. Cl.
H02P 21/00 (2016.01)
B60L 15/00 (2006.01)
(Continued)

(52) U.S. Cl.
CPC ............ H02P 21/09 (2016.02); B60L 15/007 (2013.01); H02P 21/22 (2016.02); *H02P 2101/45* (2015.01); *H02P 2103/10* (2015.01)

(58) Field of Classification Search
CPC ...... H02P 21/09; H02P 21/22; H02P 2101/45; H02P 2103/10; H02P 9/04; H02P 9/102; H02P 9/48; H02P 9/00
See application file for complete search history.

(56) References Cited

U.S. PATENT DOCUMENTS

| | | | | | |
|---|---|---|---|---|---|
| 4,949,021 | A | * | 8/1990 | Rozman .................... | H02P 9/08 |
| | | | | | 318/400.14 |
| 5,430,362 | A | * | 7/1995 | Carr ........................ | H02P 9/302 |
| | | | | | 318/779 |

(Continued)

FOREIGN PATENT DOCUMENTS

| | | |
|---|---|---|
| JP | 2016-10190 A | 5/2016 |
| JP | 2016-149904 A | 8/2016 |

(Continued)

OTHER PUBLICATIONS

International Search Report (PCT/ISA/210) issued in PCT Application No. PCT/JP2022/038622 dated Jan. 10, 2023 with English translation (4 pages).

(Continued)

*Primary Examiner* — Julio C. Gonzalez

(74) *Attorney, Agent, or Firm* — Crowell & Moring LLP

(57) ABSTRACT

An object of the present invention is to provide an electric power generation system that can stably control, with one electric power converter, output electric power of a main winding and an auxiliary winding of a dual-winding induction electric power generator. For this purpose, in an electric power generation system including an electric power generator having a stator including a main winding and an auxiliary winding, a rectifier connected to the main winding, (Continued)

an electric power converter that is connected to the auxiliary winding and controls voltages of the main winding and the auxiliary winding, and a controller that outputs a control signal according to a voltage command value of the auxiliary winding to the electric power converter, the controller calculates a voltage change amount of the auxiliary winding generated by interference of a magnetic flux of the main winding with the auxiliary winding, on the basis of a current and the voltage of the main winding, and adds the voltage change amount to the voltage command value of the auxiliary winding.

1 Claim, 7 Drawing Sheets

(51) Int. Cl.

| | |
|---|---|
| *H02P 21/09* | (2016.01) |
| *H02P 21/22* | (2016.01) |
| *H02P 101/45* | (2016.01) |
| *H02P 103/10* | (2016.01) |

(56) References Cited

U.S. PATENT DOCUMENTS

| | | | |
|---|---|---|---|
| 2018/0034395 A1* | 2/2018 | Huang | .................. H02P 9/302 |
| 2022/0001854 A1 | 1/2022 | Kadota et al. | |
| 2023/0253858 A1 | 8/2023 | Nishihama et al. | |

FOREIGN PATENT DOCUMENTS

| | | |
|---|---|---|
| JP | 2021-48671 A | 3/2021 |
| JP | 6923722 B1 | 8/2021 |
| WO | WO 2020/116272 A1 | 6/2020 |

OTHER PUBLICATIONS

Japanese-language Written Opinion (PCT/ISA/237) issued in PCT Application No. PCT/JP2022/038622 dated Jan. 10, 2023 with English translation (5 pages).
International Preliminary Report on Patentability (PCT/IB/338 & PCT/IB/373) issued in PCT Application No. PCT/JP2022/038622 dated May 10, 2024, Including English translation of document C2 (Japanese-language Written Opinion (PCT/ISA/237), filed on Mar. 6, 2024) (5 pages).

* cited by examiner

ELECTRIC POWER GENERATION SYSTEM

TECHNICAL FIELD

The present invention relates to an electric power generation system including a dual-winding induction electric power generator.

BACKGROUND ART

There are known drive systems that use an electric power generator including a stator having a main winding and an auxiliary winding. For example, Patent Document 1 provides a simply configured drive controller of a multiple-winding motor having a plurality of sets of winding groups. For each winding group of the multiple-winding motor, the drive controller includes an electric power converter that drives the winding group. The drive controller includes a compensation amount computing section that determines, by using a signal of a first control section that controls a first electric power converter that drives a first winding group in the winding groups, a compensation amount by which a signal of another control section that controls another electric power converter other than the first electric power converter is compensated. The other control section is a control system having dead time in control, the other electric power converter is controlled by compensating for the signal of the other control section by the compensation amount determined by the compensation amount computing section, and the first electric power converter is controlled with the signal of the first control section uncompensated. As a result, interference between the winding groups can be reduced and the control system can be stabilized even in a control configuration of unidirectional communication.

In addition, in a controller in Patent Document 2 applied to a multiple-winding rotating machine system including a multiple-winding rotating machine that has a plurality of winding groups having electrical specifications equivalent to each other, a plurality of electric power converters each of which is provided for one of the plurality of winding groups, and a current sensor, a decoupling section performs a decoupling control computation of compensating for an interference voltage due to magnetic coupling. The decoupling section "integrates" an inverse model term related to a post-controller command current of an axis of interest of a subject system with a decoupling control term including a mutual inductance and a current differential value related to a post-controller command current of an axis of interest of another system. In addition, the decoupling section "integrates" a decoupling control term including an angular velocity and a self-inductance related to a post-controller command current of a mating axis of the subject system with a decoupling control term including an angular velocity and a mutual inductance related to a post-controller command current of a mating axis of the other system. Thus, the control configuration of the decoupling section can be simplified.

PRIOR ART DOCUMENT

Patent Documents

Patent Document 1: JP-2016-101090-A
Patent Document 2: JP-2016-149904-A

SUMMARY OF THE INVENTION

Problem to be Solved by the Invention

In an induction electric power generator including a stator having a main winding and an auxiliary winding, currents and voltages generated in each winding influence each other since the main winding and the auxiliary winding are magnetically coupled with each other, and accordingly, the stability of a control system worsens.

In Patent Document 1 mentioned above, an electric power converter is provided for each winding of the multiple-winding motor, and a command value of the first electric power converter is used to compensate for the signal of the other control section that controls the electric power converter other than the first electric power converter, so that interference between the windings is reduced. However, since an electric power converter is provided for each winding in this scheme, this results in an increase in the cost by an amount corresponding to the number of the electric power converters.

In addition, in Patent Document 2, too, an electric power converter is provided for each winding of the multiple-winding rotating machine, and, as with Patent Document 1, the cost increases by an amount corresponding to the number of the electric power converters. Furthermore, although Patent Document 2 discloses a technology that simplifies the control configuration of the decoupling section, this is a technology that can be realized under the condition that the electrical specifications of the plurality of windings are equivalent to each other, and accordingly, cannot be applied to a multiple-winding rotating machine having a plurality of windings whose electrical specifications are different from each other.

The present invention has been made in view of the problems described above, and an object thereof is to provide an electric power generation system that can stably control, with one electric power converter, output electric power of a main winding and an auxiliary winding of a dual-winding induction electric power generator.

Means for Solving the Problem

In order to achieve the object described above, the present invention provides an electric power generation system including an electric power generator having a stator including a main winding and an auxiliary winding, a rectifier connected to the main winding, an electric power converter that is connected to the auxiliary winding and controls voltages of the main winding and the auxiliary winding, and a controller that outputs a control signal according to a voltage command value of the auxiliary winding to the electric power converter, and the controller is configured to calculate a voltage change amount of the auxiliary winding generated by interference of a magnetic flux of the main winding with the auxiliary winding, on the basis of a current and the voltage of the main winding, and add the voltage change amount to the voltage command value.

According to the thus configured present invention, by compensating for the voltage command value of the auxiliary winding with the voltage change amount of the auxiliary winding generated by the interference of the magnetic flux of the main winding with the auxiliary winding, it becomes possible with the one electric power converter to stably control an output voltage of the auxiliary winding. Accordingly, it becomes possible to stably control also an output voltage of the main winding that is generally proportional to the output voltage of the auxiliary winding.

Advantages of the Invention

According to the present invention, it becomes possible to stably control, with one electric power converter, output electric power of a main winding side and an auxiliary winding in an electric power generation system including a dual-winding induction electric power generator.

BRIEF DESCRIPTION OF THE DRAWINGS

FIG. 2 is a diagram depicting a configuration of an electric driving system to which an electric power generation system in the first embodiment of the present invention is applied.

FIG. 3 is a functional block diagram of a controller in the first embodiment of the present invention.

FIG. 6 is a block diagram depicting a process performed by a voltage command compensating section in the first embodiment of the present invention.

MODES FOR CARRYING OUT THE INVENTION

Figure 1:
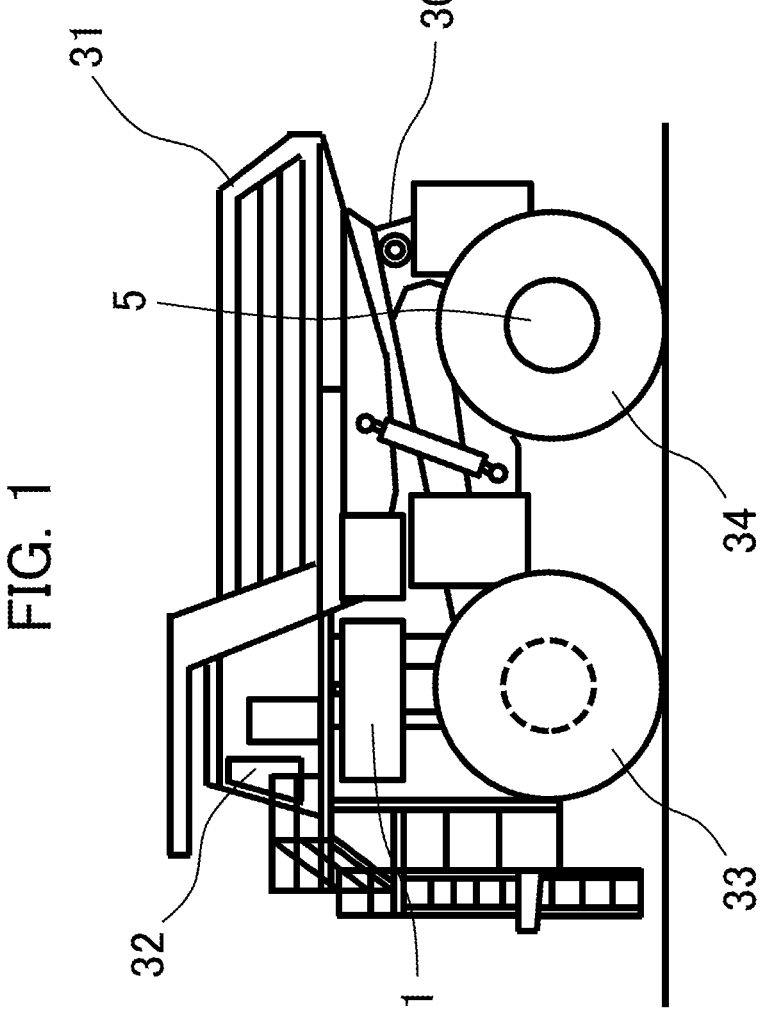
FIG. 1 is a diagram depicting a configuration of a dump truck in a first embodiment of the present invention.

Hereinbelow, embodiments of the present invention are explained by using the figures. Note that equivalent elements are denoted by identical reference characters in the figures, and overlapping explanations are omitted as appropriate. In addition, while an electric power generation system according to the present invention is applied to an electric driving system for a dump truck in the present embodiments, application subjects of the present invention are not limited to this.

First Embodiment

FIG. 1 depicts a configuration of a dump truck in a first embodiment of the present invention. In FIG. 1, the dump truck includes a machine body 30, a prime mover 1, a vessel 31 attached to an upper rear part of the machine body 30 in a vertically rotatable manner, and an operator's seat 32 provided at an upper front part of the machine body 30. In addition, a pair of left and right driven wheels 33 are arranged at a lower front part of the machine body 30, and a pair of left and right driving wheels 34 are arranged at a lower rear part of the machine body 30. The driving wheels 34 are driven by a travel motor 5. The dump truck for mining repeatedly performs a series of work cycles of being loaded with earth and sand at a loading site, travelling from the loading site to a dumping site, dumping the earth and sand at the dumping site, and traveling from the dumping site to the loading site.

Figure 2:
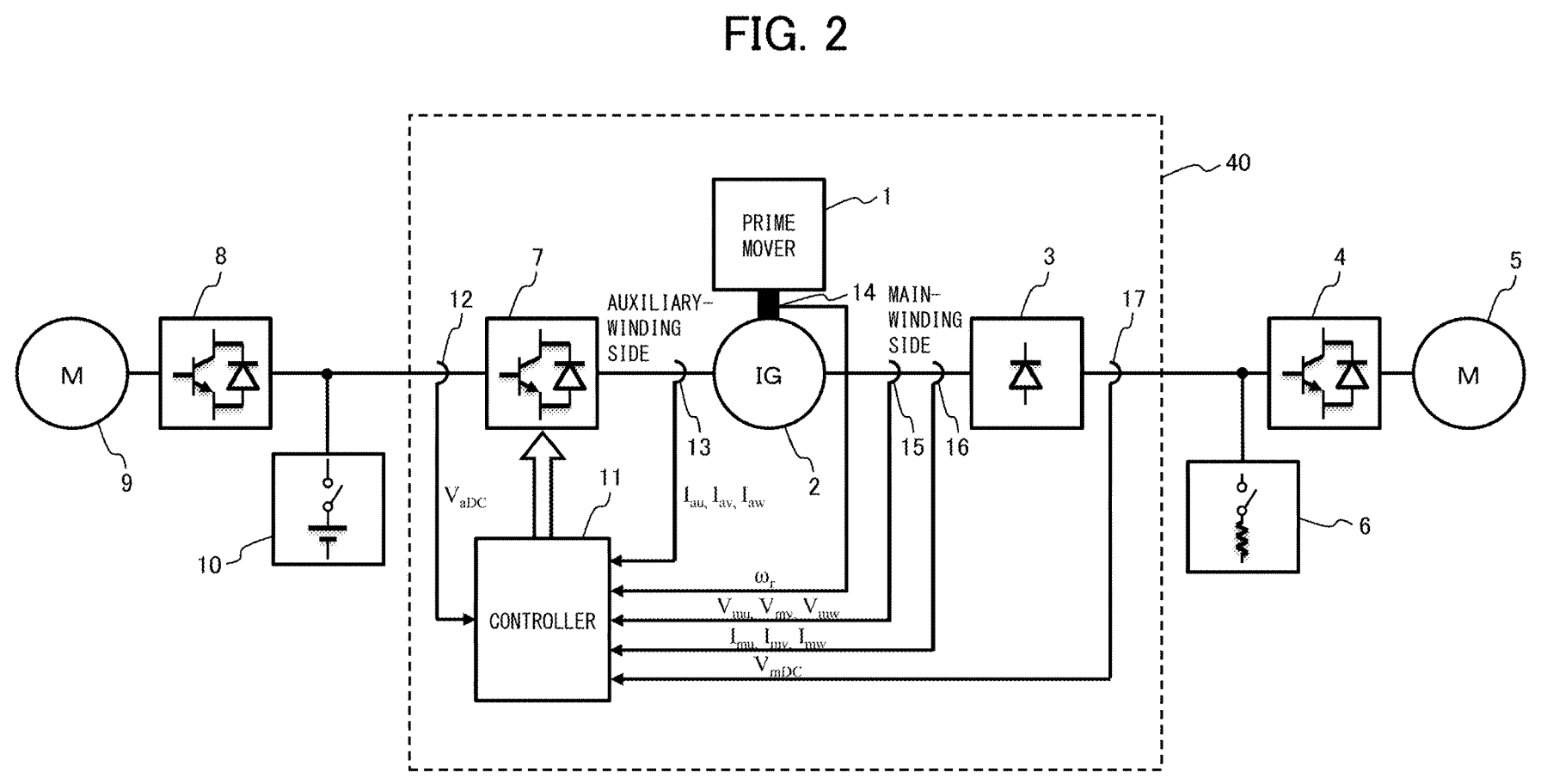

FIG. 2 is a configuration diagram of an electric driving system mounted on the dump truck depicted in FIG. 1. In FIG. 2, the electric driving system includes the prime mover 1, a dual-winding induction electric power generator 2 including a stator having a main winding and an auxiliary winding, a rectifier 3, a travel inverter 4, the travel motor 5, a regenerative discharge resistor 6, an electric power converter 7, an auxiliary machine inverter 8, an auxiliary machine motor 9, a starting battery 10, a controller 11, a first voltage sensor 12, a first current sensor 13, a rotation sensor 14, a second voltage sensor 15, a second current sensor 16, and a third voltage sensor 17. Here, the prime mover 1, the dual-winding induction electric power generator 2, the rectifier 3, the electric power converter 7, the controller 11, the first voltage sensor 12, the first current sensor 13, the rotation sensor 14, the second voltage sensor 15, the second current sensor 16, and the third voltage sensor 17 are included in an electric power generation system 40 in the present embodiment.

The prime mover 1 rotates a rotor of the dual-winding induction electric power generator 2. The main winding of the dual-winding induction electric power generator 2 is connected to the travel inverter 4 via the rectifier 3. The travel inverter 4 is connected to the travel motor 5. The regenerative discharge resistor 6 is connected to the rectifier 3 and the travel inverter 4 when the travel motor 5 is generating electric power. The auxiliary winding of the dual-winding induction electric power generator 2 is connected to the auxiliary machine inverter 8 via the electric power converter 7. The auxiliary machine inverter 8 is connected to the auxiliary machine motor 9. The starting battery 10 is connected to the electric power converter 7 and the auxiliary machine inverter 8 when the dual-winding induction electric power generator 2 has been started.

In addition, since the output power of the travel motor 5 is greater than the output power of the auxiliary machine motor 9, and electric power required for the travel inverter 4 is greater than electric power required for the auxiliary machine inverter 8, the cost is reduced not by connecting an inverter which is more expensive than the rectifier to the travel inverter 4, but by connecting the inverter to the auxiliary machine inverter 8 for which smaller electric power is required, as in the present embodiment.

Since the main winding and the auxiliary winding are magnetically coupled with each other, voltages of the main winding and the auxiliary winding of the dual-winding induction electric power generator 2 are generally proportional to each other. Accordingly, voltages of the main winding of the dual-winding induction electric power generator 2 can be controlled by the electric power converter 7 changing voltages of the auxiliary winding of the dual-winding induction electric power generator 2. If the dual-winding induction electric power generator 2 is a synchronous electric power generator, a brush is necessary for energization of an excitation winding that controls voltages, but it becomes unnecessary to use a brush, by using an induction electric power generator as in the present invention.

Figure 3:
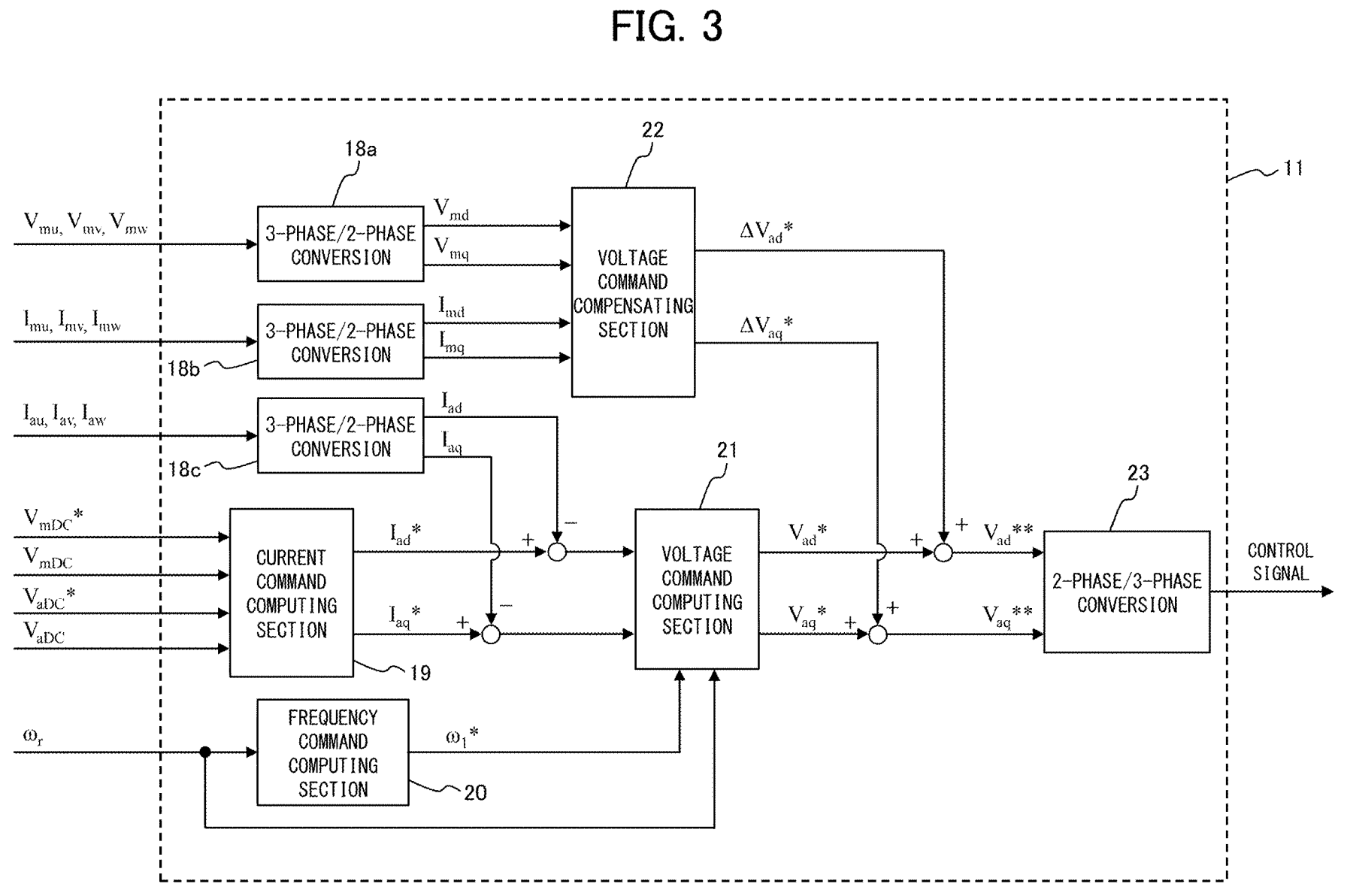

Next, a configuration of the controller 11 that controls the electric power converter 7 is explained with reference to FIG. 3. The controller 11 includes 3-phase/2-phase converting sections 18a, 18b, and 18c, a current command computing section 19, a frequency command computing section 20, a voltage command computing section 21, a voltage command compensating section 22, and a 2-phase/3-phase converting section 23. The controller 11 is configured by using a control section having a computation processing function, an input/output interface that performs signal input and output to and from an external device, and the like, and realizes a function of each section by executing a program stored in a storage device such as a ROM. In the present embodiment, the controller 11 performs voltage control and current control on the electric power converter 7 such that voltages and currents according to a DC voltage command value VmDC*on the main machine side and a DC voltage command value VaDC*on the auxiliary machine side that are inputted to the controller 11 are attained.

In the voltage control, for example, a proportional integration computation is performed at the current command computing section 19 by using values (a DC voltage VmDC on the main machine side and a DC voltage VaDC on the auxiliary machine side) acquired from the first voltage sensor 12 and the third voltage sensor 17, and auxiliary winding current command values Iad* and Iaq* are outputted. In the current control, for example, a proportional integration computation is performed at the voltage command computing section 21 by using values (a d-axis auxiliary winding current Iad and a q-axis auxiliary winding current Iaq) obtained by coordinate transformation of values (3-phase currents Iau, Iav, and Iaw of the auxiliary winding) acquired from the first current sensor 13 onto dq axes at the 3-phase/2-phase converting section 18c, and auxiliary winding voltage command values Vad* and Vaq* are outputted. At the voltage command computing section 21, a value ωr acquired from the rotation sensor 14 and a frequency command value ω1* are used for compensating for an induced voltage generated by rotation of the rotor of the dual-winding induction electric power generator 2 and an interference component between the dq axes, respectively.

Figure 4:
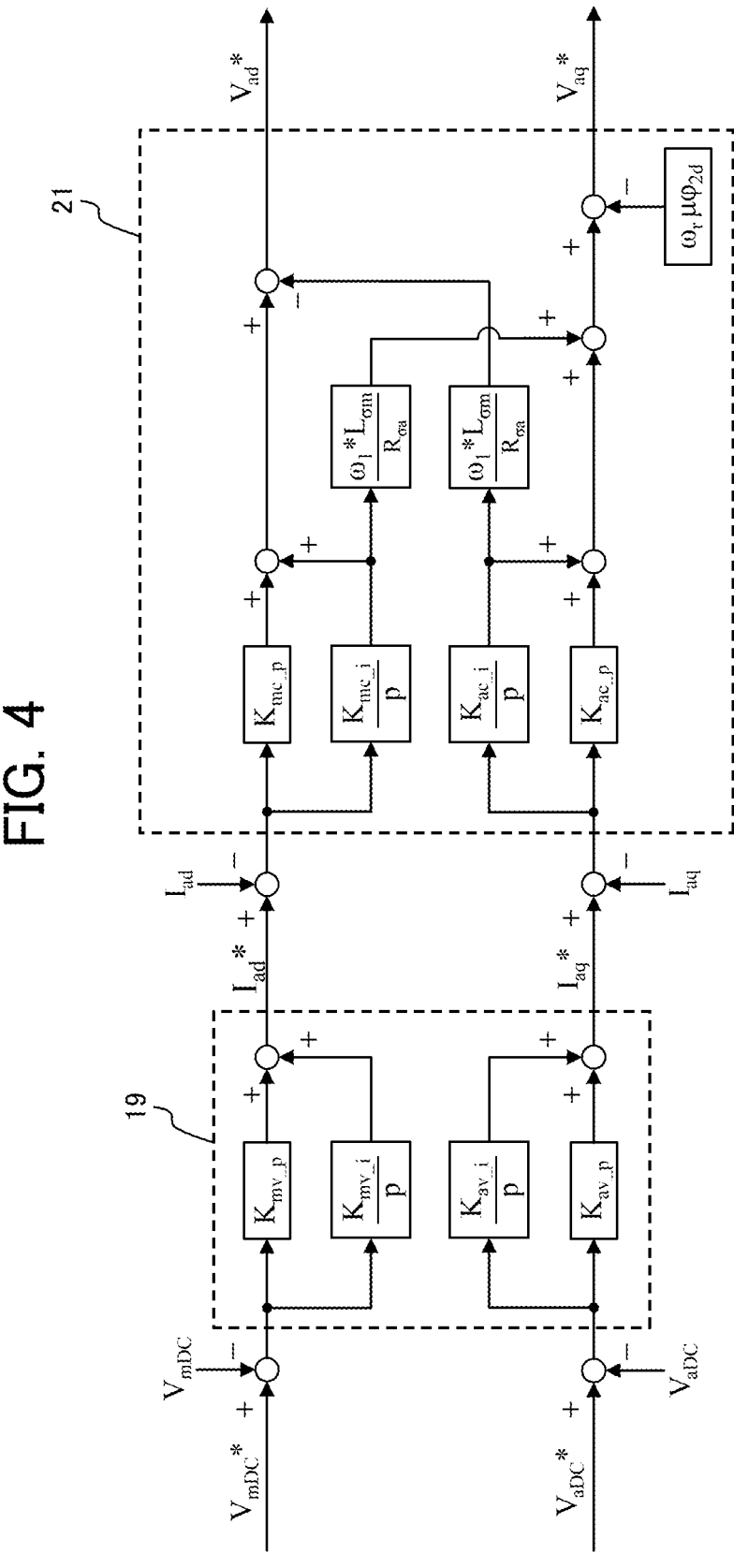
FIG. 4 is a block diagram depicting a process performed by a current command computing section and a voltage command computing section in the first embodiment of the present invention.

FIG. 4 is a block diagram depicting a process performed by the current command computing section 19 and the voltage command computing section 21. The current command computing section 19 performs proportional integration of the difference between the DC voltage command value VmDC* and the DC voltage VmDC on the main machine side, and outputs the proportional integrated value as the d-axis auxiliary winding current command value Iad*. In the figure, Kmv_p is a voltage control proportional gain on the main machine side, and Kmv_i is a voltage control integral gain on the main machine side.

In addition, the current command computing section 19 performs proportional integration of the difference between the DC voltage command value VaDC* and the DC voltage VaDC on the auxiliary machine side, and outputs the proportional integrated value as the q-axis auxiliary winding current command value Iaq*. Note that, in the figure, Kav_p is a voltage control proportional gain on the auxiliary machine side, and Kav_i is a voltage control integral gain on the auxiliary machine side.

The voltage command computing section 21 subtracts an interference component generated between the dq axes from the proportional integrated value of the difference between the d-axis auxiliary winding current command value Iad* and the d-axis auxiliary winding current Iad, and outputs an obtained value as the d-axis auxiliary winding voltage command value Vad*. The interference component generated between the dq axes mentioned here is obtained by multiplying the integrated value of the difference between the d-axis auxiliary winding current command value Iad* and the d-axis auxiliary winding current Iad by ω1*Lσm/Rσa. Note that, in the figure, Kmc_p is a current control proportional gain on the main machine side, and Kmc_i is a current control integral gain on the main machine side.

In addition, the voltage command computing section 21 adds an interference component generated between the dq axes and an induced voltage ωr*μ*φ2d to a proportional integrated value of the difference between the q-axis auxiliary winding current command value Iaq* and the q-axis auxiliary winding current Iaq, and outputs an obtained value as the q-axis auxiliary winding voltage command value Vaq*. The interference component generated between the dq axes mentioned here is obtained by multiplying an integrated value of the difference between the q-axis auxiliary winding current command value Iaq* and the q-axis auxiliary winding current Iaq using a current control integral gain Kac_i on the auxiliary machine side by ω1*Lσm/Rσa. Note that, in the figure, Kac_p is a current control proportional gain on the auxiliary machine side, and Kac_i is a current control integral gain on the auxiliary machine side.

Figure 5:
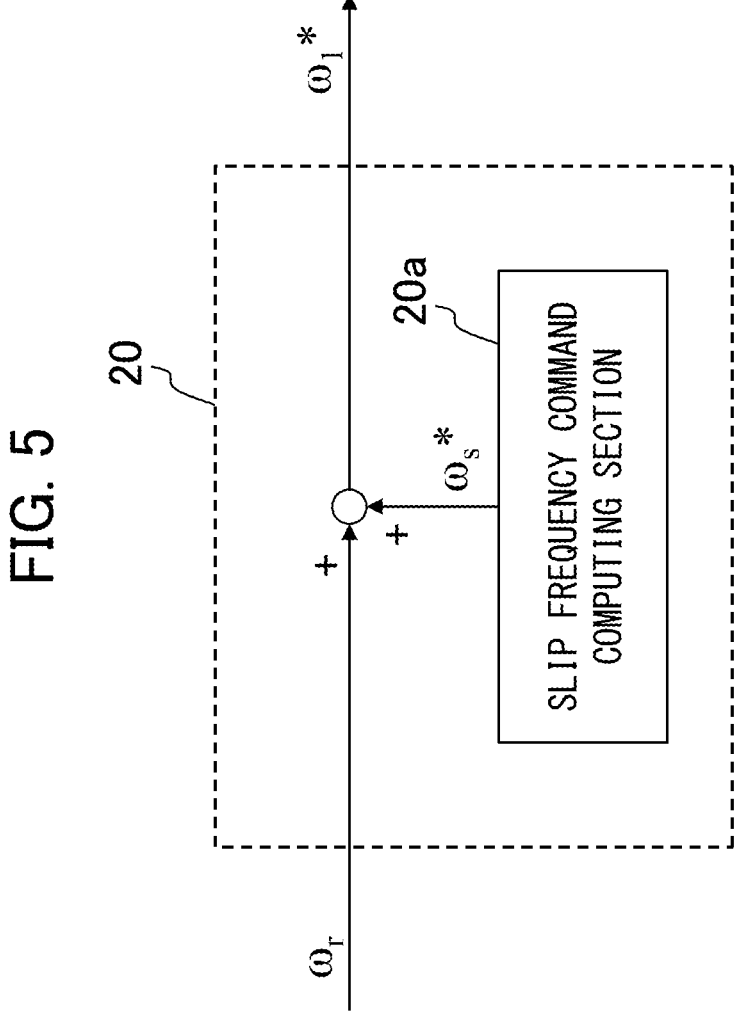
FIG. 5 is a block diagram depicting a process performed by a frequency command computing section in the first embodiment of the present invention.

FIG. 5 is a block diagram depicting a process performed by the frequency command computing section 20. The frequency command computing section 20 adds the frequency command value ωs* calculated at a slip frequency command computing section 20a to the frequency or acquired from the rotation sensor 14, and outputs an obtained value as the frequency command value ω1*.

Next, a role of the voltage command compensating section 22 is explained. In FIG. 2, the main winding and the auxiliary winding are magnetically coupled with each other in the dual-winding induction electric power generator 2, and accordingly, an interference component is generated between the windings. This phenomenon can be explained by using a state equation in an auxiliary winding section of the dual-winding induction machine 2 indicated in Formula 1.

$$p\begin{bmatrix}I_{ad}\\I_{aq}\end{bmatrix}=$$ [Math. 1]

$$\begin{bmatrix}\dfrac{R_{\sigma m}}{L_{\sigma m}} & 0\\[2mm] 0 & \dfrac{R_{\sigma m}}{L_{\sigma m}}\end{bmatrix}\cdot\begin{bmatrix}I_{md}\\I_{mq}\end{bmatrix}+\begin{bmatrix}-\dfrac{R_{\sigma a}}{L_{\sigma m}} & \omega_1\\[2mm] -\omega_1 & -\dfrac{R_{\sigma a}}{L_{\sigma m}}\end{bmatrix}\cdot\begin{bmatrix}I_{ad}\\I_{aq}\end{bmatrix}+\begin{bmatrix}-\dfrac{\mu}{L_{\sigma m}\tau_2} & -\dfrac{\omega_r\mu}{L_{\sigma m}}\\[2mm] \dfrac{\omega_r\mu}{L_{\sigma m}} & -\dfrac{\mu}{L_{\sigma m}\tau_2}\end{bmatrix}\cdot$$

$$\begin{bmatrix}\varphi_{2d}\\\varphi_{2q}\end{bmatrix}+\begin{bmatrix}-\dfrac{1}{L_{\sigma m}} & 0\\[2mm] 0 & -\dfrac{1}{L_{\sigma m}}\end{bmatrix}\cdot\begin{bmatrix}V_{md}\\V_{mq}\end{bmatrix}+\begin{bmatrix}\dfrac{1}{L_{\sigma a}} & 0\\[2mm] 0 & \dfrac{1}{L_{\sigma a}}\end{bmatrix}\cdot\begin{bmatrix}V_{ad}\\V_{aq}\end{bmatrix}$$

Symbols in Formula 1 are set as follows.

Rσm: main winding resistance related to the auxiliary winding in the dq axes model Rσa: auxiliary winding resistance related to the auxiliary winding in the dq axes model Lσm: main winding self-inductance related to the auxiliary winding in the dq axes model Lσa: auxiliary winding self-inductance related to the auxiliary winding in the dq axes model μ: primary conversion coefficient related to the auxiliary winding τ2: secondary time constant (=secondary inductance/secondary resistance)

p: differential operator

Imd, Imq: d-axis main winding current, q-axis main winding current

Vmd, Vmq: d-axis main winding voltage, q-axis main winding voltage

Vad, Vaq: d-axis auxiliary winding voltage, q-axis auxiliary winding voltage

φ2d, φ2q: d-axis secondary magnetic flux, q-axis secondary magnetic flux

ω1: primary frequency

Organizing Formula 1 gives Formula 2.

$$\begin{bmatrix} V_{ad} \\ V_{aq} \end{bmatrix} = \frac{L_{\sigma a}}{L_{\sigma m}} \left\{ \begin{bmatrix} R_{\sigma a} + pL_{\sigma m} & -\omega_1 L_{\sigma m} \\ \omega_1 L_{\sigma m} & R_{\sigma a} + pL_{\sigma m} \end{bmatrix} \cdot \begin{bmatrix} I_{ad} \\ I_{aq} \end{bmatrix} + \begin{bmatrix} \frac{\mu}{\tau_2} & \omega_r \mu \\ -\omega_r \mu & \frac{\mu}{\tau_2} \end{bmatrix} \cdot \begin{bmatrix} \varphi_{2d} \\ \varphi_{2q} \end{bmatrix} + \begin{bmatrix} -R_{\sigma m} & 0 \\ 0 & -R_{\sigma m} \end{bmatrix} \cdot \begin{bmatrix} I_{md} \\ I_{mq} \end{bmatrix} + \begin{bmatrix} V_{md} \\ V_{mq} \end{bmatrix} \right\}$$
[Math. 2]

Formula 2 shows that, as to the auxiliary winding voltages, the main winding currents Imd and Imq and the main winding voltages Vmd and Vmq on the dq axes are included. Terms related to the main winding currents and the main winding voltages are an interference component of the main winding in the auxiliary winding, and become a cause of destabilization in controlling the dual-winding induction electric power generator 2. Accordingly, by compensating for this interference component by the controller 11, it is possible to stably control the dual-winding induction electric power generator 2 even in a case where the main winding and the auxiliary winding are magnetically coupled with each other. Specifically, voltage compensation amounts ΔVad* and ΔVaq* calculated at the voltage command compensating section 22 are added to the auxiliary winding voltage command values Vad* and Vaq* calculated at the voltage command computing section 21, respectively.

Figure 6:
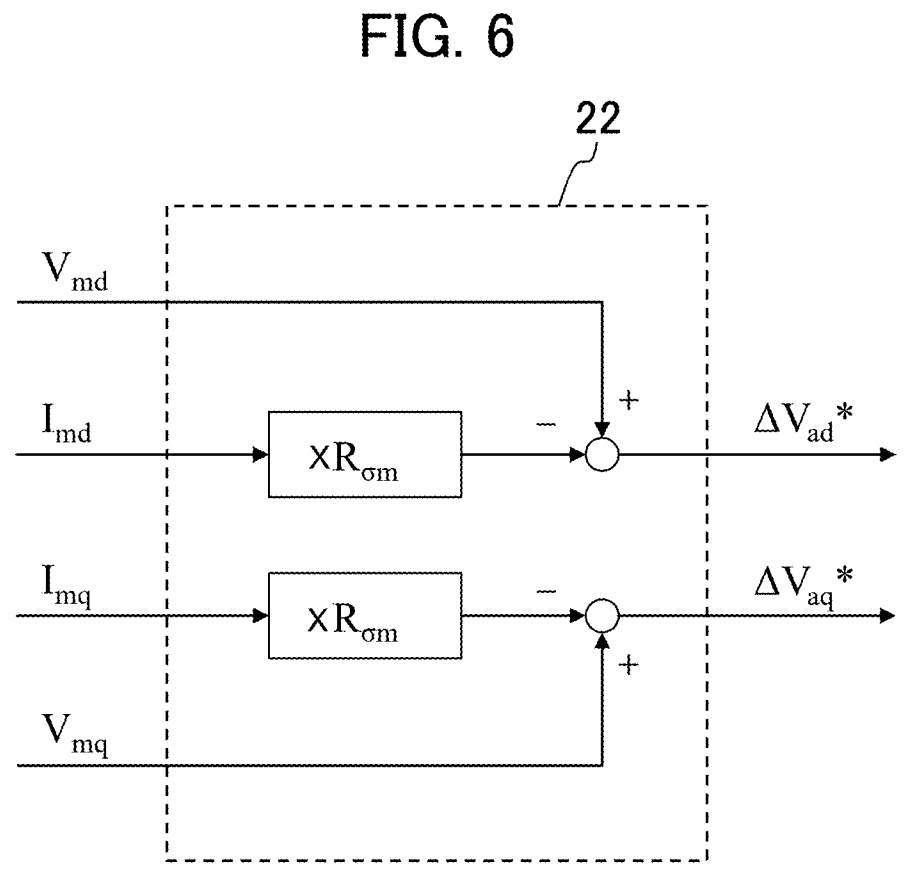

FIG. 6 is a block diagram depicting a process performed by the voltage command compensating section 22. Values (3-phase currents Imu, Imv, and Imw of the main winding and 3-phase voltages Vmu, Vmv, and Vmw of the main winding) acquired from the second voltage sensor 15 and the second current sensor 16 are coordinate-transformed at the 3-phase/2-phase converting sections 18a and 18b, respectively, and the values (Imd, Imq, Vmd, and Vmq) obtained by the coordinate transformation are inputted to the voltage command compensating section 22. The d-axis voltage compensation amount ΔVad*is the difference between the d-axis main winding voltage Vmd and the product of the d-axis main winding current Imd and the main winding resistance Rσm related to the auxiliary winding, and the q-axis voltage compensation amount ΔVaq*is the difference between the q-axis main winding voltage Vmq and the product of the q-axis main winding current Imq and the main winding resistance Rσm related to the auxiliary winding. By directly using the values acquired from the voltage sensor 15 and the current sensor 16 in this manner, the compensation voltage amounts ΔVad* and ΔVaq*can be calculated without a computation delay.

SUMMARY

In the present embodiment, in the electric power generation system 40 including the electric power generator 2 having the stator including the main winding and the auxiliary winding, the rectifier 3 connected to the main winding, the electric power converter 7 that is connected to the auxiliary winding and controls the voltages of the main winding and the auxiliary winding, and the controller 11 that outputs a control signal according to the voltage command values Vad* and Vaq* of the auxiliary winding to the electric power converter 7, the controller 11 calculates the voltage change amounts ΔVad* and ΔVaq* of the auxiliary winding generated by interference of the magnetic flux of the main winding with the auxiliary winding, on the basis of the currents Imd and Imq and the voltages Vmd and Vmq of the main winding, and adds the voltage change amounts ΔVad* and ΔVaq* to the voltage command values Vad* and Vaq* of the auxiliary winding.

According to the thus configured present embodiment, by compensating for the voltage command values Vad* and Vaq* of the auxiliary winding with the voltage change amounts ΔVad* and ΔVaq* of the auxiliary winding generated by the interference of the magnetic flux of the main winding with the auxiliary winding, it becomes possible with the one electric power converter 7 to stably control the output voltages of the auxiliary winding. Accordingly, it becomes possible to stably control also the output voltages of the main winding that are generally proportional to the output voltages of the auxiliary winding.

In addition, the electric power generation system 40 in the present embodiment includes the voltage sensor 15 that senses the voltages Vmd and Vmq of the main winding and the current sensor 16 that senses the currents Imd and Imq of the main winding, and the controller 11 calculates, as the voltage change amounts ΔVad* and ΔVaq*, the differences between the products of the currents Imd and Imq of the main winding and the main winding resistance Rσm related to the auxiliary winding and the voltages Vmd and Vmq of the main winding. Accordingly, it becomes possible to calculate the voltage change amounts ΔVad* and ΔVaq* without a computation delay.

Second Embodiment

A second embodiment of the present invention is explained with a focus on differences from the first embodiment.

Figure 7:
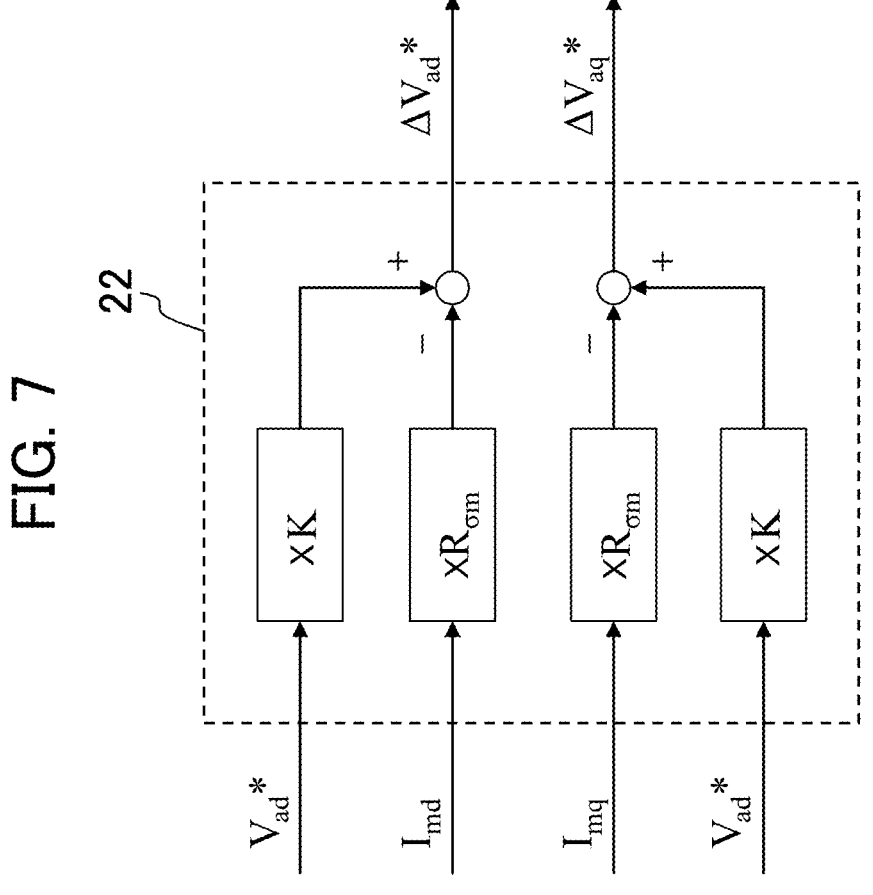
FIG. 7 is a block diagram depicting a process performed by the voltage command compensating section in a second embodiment of the present invention.

FIG. 7 is a block diagram depicting a process performed by the voltage command compensating section 22 in the present embodiment. In FIG. 7, the voltage command compensating section 22 receives input of the voltage command values Vad* and Vaq* of the auxiliary winding outputted from the voltage command computing section 21, instead of the main winding voltages Vmd and Vmq sensed by the second voltage sensor 15. The voltage command compensating section 22 uses a property that the voltages of the main winding of the winding induction electric power generator 2 are generally proportional to the voltages of the auxiliary winding, and calculates estimated values of the main winding voltages Vmd and Vmq by multiplying the voltage command values Vad* and Vaq* of the auxiliary winding by a correction gain K (the ratio of the main winding voltages to the auxiliary winding voltages).

SUMMARY

The controller 11 in the present embodiment calculates, as the voltage change amounts ΔVad* and ΔVaq*, the differences between the products of the currents Imd and Imq of the main winding of the electric power generator 2 and the main winding resistance Rσm related to the auxiliary winding of the electric power generator 2, and the estimated main winding voltage values obtained by multiplying the voltage command values Vad* and Vaq* of the electric power converter 7 by the correction gain K.

In the thus configured present embodiment, too, advantages similar to those in the first embodiment can be achieved. In addition, since it becomes unnecessary to use the second voltage sensor 15 that senses the main winding voltages Vmd and Vmq, it becomes possible to simplify the configuration of the electric power generation system 40.

While the embodiments of the present invention are explained in detail thus far, the present invention is not limited to the embodiments described above and includes various modification examples. For example, the embodiments described above are explained in detail in order to explain the present invention in an easy-to-understand manner, and the present invention is not necessarily limited to embodiments including all the constituent elements explained. In addition, some of the constituent elements of an embodiment can also be added to the constituent elements of another embodiment, and some of the constituent elements of an embodiment can also be deleted or replaced with some of the constituent elements of another embodiment.

DESCRIPTION OF REFERENCE CHARACTERS

1: Prime mover
2: Dual-winding induction electric power generator
3: Rectifier
4: Travel inverter
5: Travel motor
6: Regenerative discharge resistor
7: Electric power converter
8: Auxiliary machine inverter
9: Auxiliary machine motor
10: Starting battery
11: Controller
12: First voltage sensor
13: First current sensor
14: Rotation sensor
15: Second voltage sensor
16: Second current sensor
17: Third voltage sensor
19: Current command computing section
20: Frequency command computing section
20*a*: Slip frequency command computing section
21: Voltage command computing section
22: Voltage command compensating section
30: Machine body
31: Vessel
32: Operator's seat
33: Driven wheel
34: Driving wheel
40: Electric power generation system

The invention claimed is:

1. An electric power generation system comprising:

an electric power generator having a stator including a main winding and an auxiliary winding;

a rectifier connected to the main winding;

an electric power converter that is connected to the auxiliary winding and controls voltages of the main winding and the auxiliary winding; and a controller that outputs a predetermined control signal to the electric power converter based on a voltage command value of the auxiliary winding, wherein the controller is configured to:

calculate a voltage, as a voltage compensation amount, equivalent to a voltage change of the auxiliary winding generated by interference of a magnetic flux of the main winding with the auxiliary winding, based on a current and the voltage of the main winding, add the voltage compensation amount to the voltage command value of the auxiliary winding, output the control signal to the electric power converter based on the voltage command value of the auxiliary winding to which the voltage compensation amount is added, have a correction gain in advance that indicates a proportional relationship between a voltage of the main winding and a voltage of the auxiliary winding, and calculate, as the voltage compensation amount, a difference between a voltage obtained by multiplying the current of the main winding by a main winding resistance and an estimated main winding voltage value obtained by multiplying the voltage command value by the correction gain.

* * * * *